US008085671B2

(12) United States Patent
Shaffer et al.

(10) Patent No.: US 8,085,671 B2
(45) Date of Patent: Dec. 27, 2011

(54) METHOD AND SYSTEM FOR PROVIDING INTEROPERABLE COMMUNICATIONS WITH CONGESTION MANAGEMENT

(75) Inventors: Shmuel Shaffer, Palo Alto, CA (US);
Shah Talukder, Los Gatos, CA (US);
Kittur V. Nagesh, Saratoga, CA (US);
Douglas J. Hall, Westerville, OH (US);
Larry R. Metzger, Wake Forest, NC (US); Yogesh Kalley, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 754 days.

(21) Appl. No.: 11/364,146

(22) Filed: Feb. 27, 2006

(65) Prior Publication Data
US 2007/0202907 A1    Aug. 30, 2007

(51) Int. Cl.
*G01R 31/08* (2006.01)
*H04J 3/14* (2006.01)
*H04B 7/00* (2006.01)
(52) U.S. Cl. ........................................ 370/237; 455/519
(58) Field of Classification Search .................. 370/229, 370/235, 237, 286, 445, 447, 448, 241, 252; 455/39, 500, 507, 517, 518–521; 340/500, 340/531, 533, 534, 825, 10.1, 825.36, 825.49; 235/435, 439, 454, 472.01, 473; 709/223, 709/224, 204, 205, 207, 227
See application file for complete search history.

(56) References Cited

U.S. PATENT DOCUMENTS

| | | | |
|---|---|---|---|
| 4,359,603 A | 11/1982 | Heaton | 370/267 |
| 4,730,306 A | 3/1988 | Uchida | 370/263 |
| 5,014,345 A | 5/1991 | Comroe et al. | 455/54 |
| 5,048,082 A | 9/1991 | Krafft et al. | 379/406.07 |
| 5,099,510 A | 3/1992 | Blinken et al. | 379/202.01 |
| 5,274,782 A | 12/1993 | Chalasani et al. | 395/325 |
| 5,436,896 A | 7/1995 | Anderson et al. | 370/260 |
| 5,539,741 A | 7/1996 | Barraclough et al. | 370/267 |
| 5,625,407 A | 4/1997 | Biggs et al. | 348/14.11 |

(Continued)

FOREIGN PATENT DOCUMENTS

EP    1 519 594 A2    3/2005

(Continued)

OTHER PUBLICATIONS

Rivero-Ángeles, Mario, "Random-Access Control Mechanisms Using Adaptive Traffic Load in ALOHA and CSMA Strategies for EDGE", May 2005, IEEE Transactions on Vehicular Technology, vol. 54, 2 (1161), 01433259.pdf.*

(Continued)

*Primary Examiner* — Ricky Ngo
*Assistant Examiner* — Paul Masur
(74) *Attorney, Agent, or Firm* — Baker Botts L.L.P.

(57) ABSTRACT

A method for providing interoperable communications with congestion management includes facilitating communications of a plurality of virtual talk groups. Each virtual talk group comprises a plurality of endpoints of different communication networks communicating using a respective communication channel. The method includes detecting, for a first virtual talk group of the plurality of virtual talk groups, a congestion event and, in response to detecting the congestion event, forming from the first virtual talk group one or more subgroups, each subgroup comprising at least two endpoints from the first virtual talk group. The method also includes assigning to each subgroup a respective alternate communication protocol for use by the plurality of endpoints of the subgroup.

41 Claims, 3 Drawing Sheets

U.S. PATENT DOCUMENTS

| | | |
|---|---|---|
| 6,011,851 A | 1/2000 | O'Connor et al. ............... 381/17 |
| 6,094,578 A | 7/2000 | Purcell et al. ................. 455/426 |
| 6,178,237 B1 | 1/2001 | Horn ........................ 379/202.01 |
| 6,185,205 B1 | 2/2001 | Sharrit et al. ................. 370/389 |
| 6,233,315 B1 | 5/2001 | Reformato et al. ......... 379/88.01 |
| 6,327,567 B1 | 12/2001 | Willehadson et al. ........ 704/270 |
| 6,374,100 B1 | 4/2002 | Smith et al. ................... 455/419 |
| 6,400,816 B1 | 6/2002 | Hjalmtysson et al. ... 379/201.03 |
| 6,404,873 B1 | 6/2002 | Beyda et al. ............. 379/202.01 |
| 6,408,327 B1 | 6/2002 | McClennon et al. ......... 709/204 |
| 6,418,214 B1 | 7/2002 | Smythe et al. ........... 379/202.01 |
| 6,453,022 B1 | 9/2002 | Weinman, Jr. ............. 379/88.13 |
| 6,501,739 B1 | 12/2002 | Cohen ......................... 370/260 |
| 6,608,820 B1 | 8/2003 | Bradshaw, Jr. ............... 370/260 |
| 6,792,092 B1 | 9/2004 | Michalewicz ............... 379/202 |
| 6,810,259 B1* | 10/2004 | Zhang ....................... 455/456.5 |
| 6,850,496 B1 | 2/2005 | Knappe et al. ............... 370/260 |
| 6,873,854 B2 | 3/2005 | Crockett et al. ............. 455/518 |
| 6,882,856 B1 | 4/2005 | Alterman et al. ............ 455/519 |
| 6,885,874 B2 | 4/2005 | Grube et al. ................. 455/520 |
| 6,912,389 B2 | 6/2005 | Bright et al. ................. 455/433 |
| 6,982,961 B2 | 1/2006 | Refai et al. ................... 370/265 |
| 6,987,480 B1 | 1/2006 | Kotick et al. ................. 342/41 |
| 6,987,841 B1 | 1/2006 | Byers et al. ................ 379/88.17 |
| 6,993,120 B2 | 1/2006 | Brown et al. .............. 379/88.13 |
| 6,996,406 B2 | 2/2006 | Lection et al. ............... 455/457 |
| 6,999,782 B2 | 2/2006 | Shaughnessy et al. ....... 455/518 |
| 6,999,783 B2 | 2/2006 | Toyryla et al. ............... 455/519 |
| 7,003,286 B2 | 2/2006 | Brown et al. ................. 455/416 |
| 7,006,607 B2 | 2/2006 | Garcia ....................... 379/88.18 |
| 7,010,106 B2 | 3/2006 | Gritzer et al. ............. 379/202.01 |
| 7,010,109 B2 | 3/2006 | Gritzer et al. ............. 379/202.01 |
| 7,010,275 B2 | 3/2006 | Davies ......................... 455/90.2 |
| 7,013,279 B1 | 3/2006 | Nelson .......................... 704/270 |
| 7,031,700 B1 | 4/2006 | Weaver et al. ............... 455/420 |
| 7,035,385 B2 | 4/2006 | Levine et al. .............. 379/88.23 |
| 7,058,168 B1 | 6/2006 | Knappe et al. ........... 379/204.01 |
| 7,079,857 B2 | 7/2006 | Maggenti et al. ............. 455/518 |
| 7,218,663 B1* | 5/2007 | Yokota et al. ................. 375/130 |
| 7,328,243 B2* | 2/2008 | Yeager et al. ................. 709/205 |
| 7,505,755 B2* | 3/2009 | Taniguchi et al. ............ 455/405 |
| 2001/0028321 A1 | 10/2001 | Krasner ...................... 342/357.1 |
| 2002/0013813 A1 | 1/2002 | Matsuoka ..................... 709/204 |
| 2002/0152305 A1* | 10/2002 | Jackson et al. ............... 709/224 |
| 2002/0178364 A1 | 11/2002 | Weiss ........................... 713/182 |
| 2003/0100326 A1 | 5/2003 | Grube et al. ................. 455/515 |
| 2003/0119540 A1 | 6/2003 | Mathis |
| 2004/0054428 A1 | 3/2004 | Sheha et al. ..................... 700/56 |
| 2004/0070515 A1* | 4/2004 | Burkley et al. ........... 340/825.49 |
| 2004/0139320 A1 | 7/2004 | Shinohara .................... 713/168 |
| 2004/0185863 A1 | 9/2004 | Ogami ...................... 455/452.1 |
| 2004/0192353 A1 | 9/2004 | Mason et al. ................. 455/457 |
| 2004/0249949 A1 | 12/2004 | Gourraud et al. ............ 709/227 |
| 2005/0135348 A1 | 6/2005 | Staack ......................... 370/353 |
| 2005/0170844 A1 | 8/2005 | Barclay et al. ............. 455/456.1 |
| 2005/0174991 A1 | 8/2005 | Keagy .......................... 370/352 |
| 2005/0232207 A1 | 10/2005 | Antoniadis et al. ........... 370/338 |
| 2005/0265256 A1 | 12/2005 | Delaney ........................ 370/254 |
| 2006/0035657 A1 | 2/2006 | Lim .............................. 455/518 |
| 2006/0063551 A1* | 3/2006 | Martin et al. ................. 455/519 |
| 2006/0114847 A1 | 6/2006 | Dssouli et al. ................ 370/261 |
| 2006/0118636 A1* | 6/2006 | Miles et al. ............... 235/472.01 |
| 2006/0165060 A1 | 7/2006 | Dua .............................. 370/352 |
| 2006/0209871 A1* | 9/2006 | Blasco Claret et al. ....... 370/437 |
| 2006/0211426 A1* | 9/2006 | Costa et al. ................... 455/450 |
| 2006/0294243 A1* | 12/2006 | Kuure et al. .................. 709/227 |
| 2007/0030144 A1* | 2/2007 | Titus et al. .................... 340/534 |
| 2007/0049314 A1* | 3/2007 | Balachandran et al. ...... 455/518 |
| 2007/0060144 A1 | 3/2007 | Mills et al. .................... 455/457 |
| 2007/0115848 A1* | 5/2007 | Chean et al. .................. 370/252 |
| 2007/0202907 A1 | 8/2007 | Shaffer et al. ................ 455/518 |
| 2007/0233802 A1* | 10/2007 | Kulkarni ...................... 709/207 |
| 2008/0037461 A1 | 2/2008 | Biltz et al. .................... 370/328 |
| 2008/0159128 A1 | 7/2008 | Shaffer et al. ................ 370/229 |
| 2008/0167049 A1 | 7/2008 | Karr et al. .................... 455/456 |
| 2009/0040021 A1* | 2/2009 | Seo et al. ...................... 340/10.1 |

FOREIGN PATENT DOCUMENTS

| | | |
|---|---|---|
| EP | 1 622 408 A1 | 2/2006 |
| WO | WO 01/91485 | 11/2001 |
| WO | WO 02/074051 | 9/2002 |

OTHER PUBLICATIONS

PCT International Search Report and Written Opinion (ISA/US) for PCT/US06/19227; 7 pages, Sep. 4, 2007.

NetworkFirst Interoperability Solved, Data Sheet, M/A-COM, Inc., ECR-7018A, http://www.networkfirst.com/resources/pdf/NetworkFirstRevised5_03.pdf, 6 pages.

Network Solution:, Information Sheet, NetworkFirst, M/A-COM, Inc., http://www.networkfirst.com/features/solution, 2 pages.

It's Our Network That Makes the Difference, Information Sheet, OpenSky Network, M/A-COM, Inc., http://www.opensky.com/network/index.asp, 2 pages.

Network Management, Information Sheet, OpenSky Network, M/A-COM, Inc., http://www.opensky.com/network/netmgmtsys.asp, 2 pages.

ACU-1000™ Interoperability NOW™, Information Sheet, Raytheon JPS Communications, http://www.jps.com/downloads/PDFS/acuupgrade.pdf, 4 page.

Interoperability Gateway, OpenSky, NetworkFirst, P25$^{IP}$, Data Sheet, M/A-COM, Inc. ECR-7054, http://www.opensky.com/network/7054.pdf, 2 pages.

C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages.

V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages.

J. Polk, et al., Dynamic Host Configuration Protocol Option for Coordinate-based Location Configuration Information, Network Working Group, Internet RFC 3825, Category: Standards Track, The Internet Society, 15 pages, Jul. 2004.

OnStar Technology, Information Sheet, OnStar Corp., http://www.onstar.com/us¯english/jsp/explore/onstar_basics/technology.jsp, 3 pages, 2005.

Cisco IP Interoperability and Collaboration System, Q&A, Copyright © Cisco Systems, Inc. www.cisco.com, 4 pages.

Cisco IPICS, Solution Overview, Copyright © Cisco Systems, Inc., www.cisco.com/go/ipics, 6 pages.

Matthews, et al., *A New Interoperability Paradigm A Concept Proposal*, Mar. 2006, *Worcester Polytechnic Institute, WPI Bioengineering Institute*, 15 pages.

PCT Notification of Transmittal of the International Search Report and the Written Opinion of the International Searching Authority, or the Declaration, mailed Feb. 27, 2007, corresponding to PCT/US06/30447 filed Aug. 3, 2006 (20 pages).

PCT Notification of Transmittal of the International Search Report and the Written Opinion of the International Searching Authority, or the Declaration, mailed Apr. 9, 2007, corresponding to PCT/US06/30294 filed Aug. 2, 2006 (20 pages).

Shaffer, et al., U.S. Appl. No. 11/149,041, filed Jun. 8, 2005, *Method and System for Communicating Using Position Information*.

Shaffer, et al., U.S. Appl. No. 11/201,832, filed Aug. 10, 2005, *Method and System for Automatic Configuration of Virtual Talk Groups Based on Location of Media Source*.

Shaffer, et al., U.S. Appl. No. 11/202,400, filed Aug. 10, 2005, *Method and System for Communicating Media Based on Location of Media Source*.

Shaffer, et al., U.S. Appl. No. 11/202,403, filed Aug. 10, 2005, *Method and System for Providing Interoperable Communications with Location Information*.

Shaffer, et al., U.S. Appl. No. 11/214,582, filed Aug. 29, 2005, *Method and System for Conveying Source Location Information*.

Shaffer, et al., U.S. Appl. No. 11/365,113, filed Feb. 28, 2006, *Method and System for Providing Interoperable Communication with Dynamic Event Area Allocation*.

Shaffer, et al., U.S. Appl. No. 11/399,031, filed Apr. 5, 2006, *Method and System for Managing Virtual Talk Groups*.

Shaffer, et al., U.S. Appl. No. 11/382,496, filed May 10, 2006, *Providing Multiple Virtual Talk Group Communication Sessions*.
Kalley, et al., U.S. Appl. No. 11/383,998, filed May 18, 2006, *Providing Virtual Talk Group Communication Sessions in Accordance with Endpoint Resources*.
Shaffer, et al., U.S. Appl. No. 11/421,994, filed Jun. 2, 2006, *Method and System for Joining a Virtual Talk Group*.
Shaffer, et al., U.S. Appl. No. 11/421,999, filed Jun. 2, 2006, *Method and System for Managing a Plurality of Virtual Talk Groups*.
Shaffer, et al., U.S. Appl. No. 11/617,019, filed Dec. 28, 2006, *Method and System for Providing Congestion Management within a Virtual Talk Group*.
Shaffer, et al., U.S. Appl. No. 11/746,960, filed May 10, 2007, *Method and System for Handling Dynamic Incidents*.
Shaffer, et al., U.S. Appl. No. 11/550,234, filed Oct. 17, 2006, *Method and System for Providing an Indication of a Communication*.
NetworkFirst Interoperability Solved, Data Sheet, M/A-COM, Inc., ECR-7018A, http://www.networkfirst.com/resources/pdf/NetworkFirstRevised5_03.pdf, 6 pages, May 2003.
Network Solution:, Information Sheet, NetworkFirst, M/A-COM, Inc., http://www.networkfirst.com/features/solution, 2 pages, 2003.
ACU-1000™ Interoperability NOW™, Information Sheet, Raytheon JPS Communications, http://www.jps.com/downloads/PDFS/acuupgrade.pdf, 4 pages, Mar. 2004.
Interoperability Gateway, OpenSky, NetworkFirst, P25$^{IP}$, Data Sheet, M/A-COM, Inc. ECR-7054, http://www.opensky.com/network/7054.pdf, 2 pages, May 2003.
C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages, Oct. 2003.
V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages, Oct. 2004.
Cisco IP Interoperability and Collaboration System, Q&A, Copyright © Cisco Systems, Inc. www.cisco.com, 4 pages, Oct. 2005.
Cisco IPICS, Solution Overview, Copyright © Cisco Systems, Inc., www.cisco.com/go/ipics, 6 pages, Oct. 2005.
MRT Urgent Communications: Service, Safety, Security, M/A-Com Emphasizes Power of IP in Seven Announcements at APCO, Aug. 18, 2002, 6 pages. http://mrtmag.com/products/new/radio_macom_emphasizes_power.
Jim McKay, *Government Technology*, "Intact Amid Chaos", Mar. 2005, 2 pages.
Ian Hoffman, *Oakland Tribune*, "Oakland's New Radios Pass Test, City, Regional Agencies Get Green Light to Buy Public-Safety Equipment," 2007, 2 pages (reprinted by Tyco Electronics and available at http://www.macom-wireless.com/news/oaklands%20new%20radios.asp), Mar. 11, 2005.

MRT Urgent Communications: Service, Safety, Security, "5 for '05 Technologies," Dec. 1, 2004, 9 pages. http://mrtmag.com/mag/radio_technologies.
MRT Urgent Communications: Service, Safety, Security, John Facella, "ROIP Success Is in the Details," Dec. 1, 2004, 3 pages. http://mrtmag.com/mag/radio_roip_success_details.
Ann Imse, *Rocky Mountain News*, "Radio Breakthrough for Cops, Firefighters," Dec. 10, 2004, 2 pgs.
*First Responder Communications*, A Supplement to MRT and Fire Chief, "IP Opens Eyes," Aug. 2004, 5 pages.
*MRT, Mobile Radio Technology*, "IP Evangelist," Apr. 2004, 4 pages, www.iwce-mrt.com.
Ron Bender, et al., *MRT; Mobile Radio Technology* "Multiple Choices for Critical Communications," Oct. 2001, 4 pages, www.mrtmag.com.
Jay Herther, et al., *MRT; Mobile Radio Technology*, "Voice-over-Interintranet Protocol for Critical Communications," Aug. 2001, 4 pages, www.mrtmag.com.
*What's New in Radio Communications*, Aug./Sep. 2001, vol. 14 No. 1, Inside: Marine Radio, 2 pages, www.westwick-farrow.com.au, Aug. 9, 2001.
Shaffer et al., U.S. Appl. No. 11/399,031, filed Apr. 5, 2006, Communication from the U.S. Patent and Trademark Office mailed Dec. 5, 2008.
Shaffer et al., U.S. Appl. No. 11/399,031, filed Apr. 5, 2006, Communication from the U.S. Patent and Trademark Office mailed Jun. 24, 2009, Dec. 5, 2008.
Shaffer et al., U.S. Appl. No. 11/617,019 filed Dec. 28, 2006, Communication from the U.S. Patent and Trademark Office mailed May 14, 2009.
Office Action from the U.S. Patent and Trademark Office for Shaffer et al., U.S. Appl. No. 11/617,019, filed Dec. 28, 2006, Nov. 28, 2009.
Shaffer et al., U.S. Appl. No. 11/617,019, Office Action from the U.S. Patent and Trademark Office dated Mar. 26, 2010.
Shaffer et al., U.S. Appl. No. 11/399,031, Final Office Action from the U.S. Patent and Trademark Office dated Jul. 8, 2010.
Shaffer et al., U.S. Appl. No. 11/617,019, Office Action from the U.S. Patent and Trademark Office dated Oct. 19, 2010.
Communication from the Patent Office of the People's Republic of China, The Second Office Action regarding Appln. 200780011091.7, Date of issue Nov. 25, 2010.
Shaffer et al., U.S. Appl. No. 11/399,031, "Method and System for Providing Interoperable Communication with Congestion Management," Office Action from the U.S. Patent and Trademark Office dated Feb. 28, 2011.
Shaffer et al., U.S. Appl. No. 11/617,019, "Method and System for Providing Congestion Management within a Virtual Talk Group," Office Action from the U.S. Patent and Trademark Office dated Apr. 15, 2011.

* cited by examiner

| VIRTUAL TALK GROUP | INCIDENT | MEMBERS |
|---|---|---|
| 1 | | 210a, 210b, 210c |
| 2 | | 212e, 212f |
| 3 | | 214a, 214b, 214c |
| 4 | | 210d, 212a, 212b, 212c, 212d, 214d, 214e |
| 5 | | 210d, 210e, 210f, 210g, 212a, 214d |

| VIRTUAL TALK GROUP | INCIDENT | MEMBERS |
|---|---|---|
| 1 | | 210a, 210b, 210c, 210d, 210e, 210f, 210g |
| 2 | | 212a, 212b, 212c, 212d, 212e, 212f |
| 3 | | 214a, 214b, 214c, 214d, 214e |
| 4 | 213 | 210d, 210e, 210f, 210g, 212a, 212b, 212c, 212d, 214d, 214e |

METHOD AND SYSTEM FOR PROVIDING INTEROPERABLE COMMUNICATIONS WITH CONGESTION MANAGEMENT

TECHNICAL FIELD OF THE INVENTION

This invention relates in general to communication systems and, more particularly, to a method and system for providing interoperable communications with congestion management.

BACKGROUND OF THE INVENTION

Many public and private groups, such as security and safety personnel (e.g., police, fire fighters and ambulance drivers) use various communication networks of differing technologies and types for communication. Many networks utilize land mobile radios communicating through push-to-talk technologies. However, communications among different endpoints of different networks such as endpoints of different police, fire or other security networks may be difficult. Collaboration between the different agencies and networks tends to be ad hoc and inefficient. When achieved, it often involves laborious manual intervention. Organizations working towards interoperability solutions include Raytheon JPS Communications, IP Blue, Twisted Pair, M/A-COM and Cisco Systems.

SUMMARY OF THE INVENTION

The present invention provides a method and system for providing interoperable communications with congestion management that substantially eliminates or reduces at least some of the disadvantages and problems associated with previous methods and systems.

In accordance with a particular embodiment, a method for providing interoperable communications with congestion management includes facilitating communications of a plurality of virtual talk groups. Each virtual talk group comprises a plurality of endpoints of different communication networks communicating using a respective communication channel. The method includes detecting, for a first virtual talk group of the plurality of virtual talk groups, a congestion event and, in response to detecting the congestion event, forming from the first virtual talk group one or more subgroups. Each subgroup comprises at least two endpoints from the first virtual talk group. The method also includes assigning to each subgroup a respective alternate communication protocol for use by the plurality of endpoints of the subgroup.

The method may further include transferring each endpoint of each subgroup to the respective alternate communication protocol of the subgroup. Where the method includes detecting a congestion event the method may also include detecting a first number of collisions within a first amount of time. A collision comprises the receipt of two or more requests for access to the respective communication channel within a second amount of time. A collision may also comprise the receipt of two or more requests for access to the respective communication channel approximately simultaneously. The method may also include detecting a congestion event by detecting, voice activity from a third number of endpoints within a fourth amount of time.

Where the method includes assigning to each subgroup an alternate communication protocol, the method may include assigning at least one of the subgroups to an instant messaging (IM) communication protocol or assigning at least one of the subgroups to an alternate communication channel.

Where the method includes forming from the first virtual talk group one or more subgroups the method may include forming the one or more subgroups based on a predetermined policy. The predetermined policy may include forming the one or more subgroups based on a priority of users of the plurality of endpoints of the first virtual talk group. The method may also include forming the one or more subgroups based on interactions of one or more of the endpoints of the first virtual talk group. The method may also include at least two subgroups having a common endpoint.

The method may also include notifying each endpoint of each subgroup that the endpoint will be assigned to the respective alternate communication protocol of the subgroup. The method may further include receiving from a first endpoint of a subgroup of the one or more subgroups an override command in response to the notification that the endpoint will be assigned to an alternate communication protocol of the subgroup. The override command may prevent the first endpoint from being assigned to the alternate communication protocol of the subgroup.

In accordance with another embodiment, a system for providing interoperable communications with congestion management includes an interface operable to facilitate communications of a plurality of virtual talk groups. Each virtual talk group comprises a plurality of endpoints of different communication networks communicating using a respective communication channel. The system includes a processor coupled to the interface and operable to detect, for a first virtual talk group of the plurality of virtual talk groups, a congestion event. In response to detecting the congestion event, the processor is operable to form from the first virtual talk group one or more subgroups. Each subgroup comprises at least two endpoints from the first virtual talk group. The processor is also operable to assign to each subgroup a respective alternate communication protocol for use by the plurality of endpoints of the subgroup.

Technical advantages of particular embodiments include systems and methods for providing interoperable communications among endpoints of various types that utilize differing technologies. Virtual talk groups may be created dynamically to enable communication among a subset of endpoints for particular circumstances, such as particular security events that arise. Particular embodiments allow for the assignment of lower priority personnel to an alternate communication protocol upon the occurrence of congestion in the virtual talk group communications. Accordingly, higher priority personnel are able to communicate through the original talk group with less of a chance of having to wait for lower priority personnel to finish using the channel. Particular embodiments assign personnel to alternate communication protocols if it is determined that too many users are trying to talk at the same time. Accordingly, in some cases users are not assigned to an alternate communication protocol unless the level of communication over the original talk group becomes too high. Particular embodiments assign personnel within a virtual talk group such that the assigned personnel use an alternate form of communication. Accordingly, the congestion of the original virtual talk group can be reduced while still allowing the user of the original virtual talk group to communicate with one another.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

Figure 1:
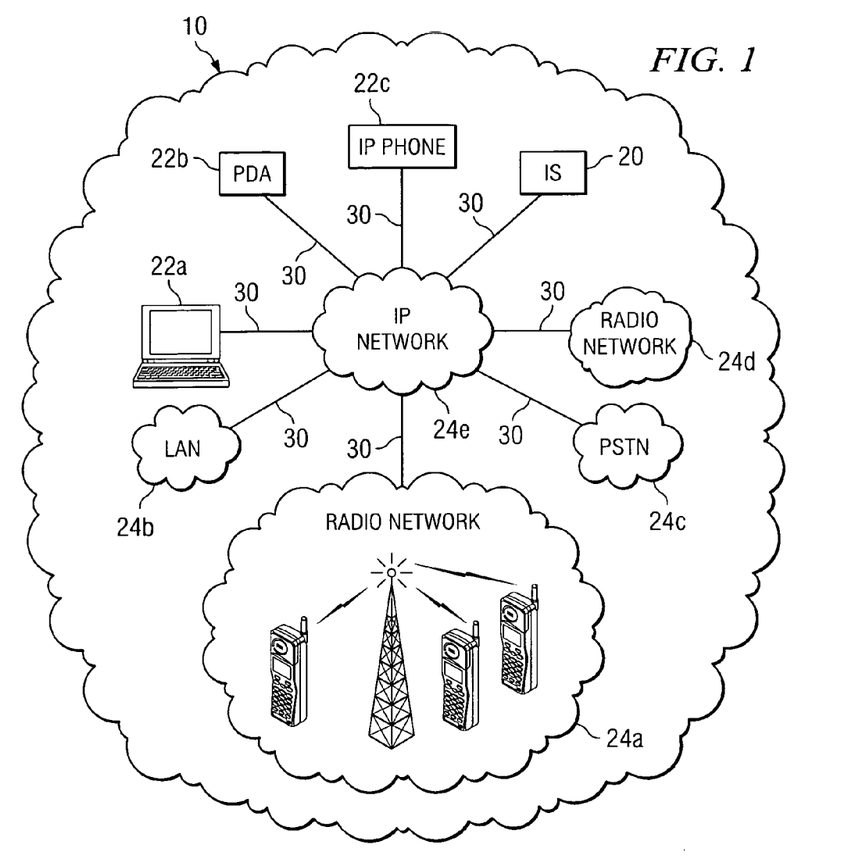
FIG. 1 illustrates a communication system with various communication networks and an interoperability system, in accordance with a particular embodiment.

FIG. 1 illustrates a communication system 10, in accordance with a particular embodiment. Communication system 10 includes communication networks 24a-24e, interoperability system (IS) 20 and endpoints 22a-22c. IS 20 is able to facilitate interoperable communication sessions between and among various communication devices, such as endpoints of communication networks 24 and endpoints 22. IS 20 uses a systems approach to offer a framework based on IP protocols and services to immediately achieve secure voice, video and other data interoperability among communication endpoints and networks utilizing different technologies.

In particular embodiments IS 20 has the ability to assign particular endpoints from congested virtual talk groups (VTGs) to alternate VTGS or subgroups. The different VTGs may communicate over different channels using the same communication technology and/or using different communication technology. When the level of communication within a particular VTG becomes too congested IS 20 may assign certain endpoints within the congested VTG to an alternate VTG (e.g. a subgroup) using an alternate communication protocol. The assignment to the alternate VTG may isolate the assigned endpoints from the original VTG or it may limit their means of communication with the endpoints that remained in the original VTG depending on the situation.

In the illustrated embodiment, communication networks 24a and 24d comprise radio networks (RNs), communication network 24b comprises a local area network (LAN), communication network 24c comprises a PSTN and communication network 24e comprises an IP network. It should be understood, however, that communication system 10 may comprise any number of IP or non-IP communication networks of any wireless or wireline form capable of communicating audio and/or video telecommunication signals, data, and/or messages, including signals, data or messages. Communication networks 24a-24e may include any number and combination of segments, nodes and endpoints to enable communication among network devices and components. Communication networks 24a-24e may be distributed locally or across multiple cities and geographic regions. Nodes may include any combination of network components, gatekeepers, call managers, conference bridges, routers, hubs, switches, gateways, base stations, endpoints or other hardware, software or embedded logic implementing any number of communication protocols that allow for the exchange of data in communication system 10. Segments 30, which may comprise any suitable wireless or wireline communication links, including one or more communication networks (e.g., WANs) as appropriate, couple various networks with each other and with endpoints 22 and IS 20. In particular embodiments, segments may include gateways for facilitating communication between various networks, such as an LMR gateway between radio network 24a and IP network 24e.

In some cases, users of endpoints of one of communication networks 24a-24e may communicate with endpoints of another of communication networks 24a-24e through IS 20. IS 20 may facilitate the communication between endpoints of different networks by itself rebroadcasting the communications of one network to another network or IS 20 may cause other components which it can control to rebroadcast the communication. A radio network, such as radio network 24a or 24d, may support communication among portable mobile station endpoints, such as LMRs, using any suitable communication methods or features, such as cellular and push-to-talk (PTT). Communication networks 24a-24e may comprise networks of particular groups or agencies (e.g., a municipality's police department network), whether operational with respect to a particular area or otherwise.

IS 20 enables, facilitates and/or provides for interoperable communication among communication endpoints and devices, such as LMRs, cellular phones, IP phones, PCs, PDAs, PSTN phones, video monitors, cameras and sensors of one or more communication networks (e.g., communication networks 24a-24e) using Internet Protocol. Such endpoints may comprise IP or non-IP-enabled endpoints. In particular embodiments, IS 20 may control gateways (for example, of segments 30) in order to map radio frequencies of particular mobile radio endpoints to IP addresses for communication to other types of radio endpoints or IP devices. For example, a particular gateway may be able to receive communications from various types of endpoints (e.g., on various types of communication networks) and may convert such communications for transmission to other types of endpoints. IS 20's control of the gateway may control the various endpoints and/or networks that receive particular communications, depending on system functionality and configuration as further discussed below. As indicated, such control may include the mapping of communications and endpoints to IP addresses for interoperable communication. In some embodiments, IS 20 may host audio conferences that bridge communications received from endpoints. As indicated above, communication system 10 (including IS 20) may include any suitable number or type of gateways (e.g., LMR and PSTN gateways), servers (e.g., multipoint conference servers), switches, routers, firewalls, access points, processors, memory or other hardware, software or encoded logic to provide functionality described herein. IS 20 is coupled to communication networks 24a-24d and endpoints 22 through IP network 24e, which may comprise any suitable IP network.

As indicated above, IS 20 uses IP to enable communication among endpoints of various networks. The manner in which IS 20 facilitates communications among endpoints may vary according to location and system or operational needs. For example, IS 20 may communicate with endpoints using multicast IP addresses assigned to an endpoint of a communication network, a group of endpoints of a communication network or one or more endpoints of multiple communication networks or alternatively using a peer to peer dialed connection or a nailed dialed connection. A group of endpoints may be combined into a VTG for communication using a particular IP address. As an example, the VTG group may be assigned a multicast IP address through which users of various endpoints may communicate on the VTG. The use of multicast IP addresses allows IS 20 to facilitate communications among communication devices and endpoints of various communication networks to provide audio, data, video and control network interoperability. As an additional example, in some cases multicast streams (e.g., utilizing multicast IP addresses) may be used. In some cases nailed dialed connections, such as those using SIP protocol, may be used for communication among endpoints and with IS 20. Various embodiments may combine communication methods to facilitate communication among endpoints. For example, in some cases certain endpoints of a virtual talk group may participate in the talk group through a multicast IP address while other endpoints may utilize a nailed SIP connection. IS 20 may control this participation, such as by controlling gateways, multipoint conferences and the mapping of communications to IP addresses.

IS 20 may be utilized and implemented in any number of market segments, such as enterprise safety and security (e.g., loss prevention), transportation, retail, public safety and federal agencies in order to provide radio and non-radio network interoperability within and between such market segments. As indicated above, such network interoperability includes the interoperability of push-to-talk voice technology within various networks and the interoperability between push-to-talk and full duplex dialed connections.

It will be recognized by those of ordinary skill in the art that endpoints 22 and IS 20 may be any combination of hardware, software, and/or encoded logic that provides communication services to a user. In the illustrated embodiment, endpoints 22 comprise a PC (endpoint 22a), a PDA (endpoint 22b) and an IP phone 22c). However, in other embodiments, endpoints 22 may include a telephone, a personal computer (PC), a video monitor, a camera, an IP phone, a cell phone, a land mobile radio (LMR), a personal digital assistant (PDA), a command center or any other communication hardware, software and/or encoded logic that supports the communication of audio, video or other data, using packets of media (or frames) or otherwise, through communication system 10. Endpoints 22 as well as endpoints and components of communication networks 24 may be capable of communicating using any particular type of technology, such as cellular, IP, PSTN, CDMA, GSM, TDMA and satellite. Endpoints 22 and IS 20 may also include unattended or automated systems, gateways, other intermediate components or other devices that can establish media sessions.

Although the illustrated embodiment includes five communication networks 24a-24e, the term "communication network" should be interpreted as generally defining any network capable of transmitting audio and/or video telecommunication signals, data, and/or messages, including signals, data or messages. Any one of networks 24a-24e may be implemented as a local area network (LAN), wide area network (WAN), cellular network, global distributed network such as the Internet, Intranet, Extranet, PSTN, LMR network, radio network (RN), CDMA network, GSM network, TDMA network, satellite network or any other form of wireless or wireline communication network.

Communications over communication networks 24a-24e may use any suitable communication protocol. In a particular embodiment, some communication networks may employ voice communication protocols that allow for the addressing or identification of endpoints, nodes, and/or other components coupled to the communication network. For example, using Internet protocol (IP), each of the components coupled together by, for example, communication network 24b in communication system 10 may be identified in information directed using IP addresses. In this manner, network 24b may support any form and/or combination of point-to-point, multicast, unicast, or other techniques for exchanging media packets among components in communication system 10. Any network components capable of exchanging audio, video, or other data are included within the scope of the present invention.

Since IP networks share a common method of transmitting data, telecommunication signals may be transmitted between telephony devices located on different, but interconnected, IP networks. In addition to being coupled to other IP networks, communication network 24b may also be coupled to non-IP telecommunication networks, for example through the use of interfaces or components, including gateways. In the illustrated embodiment, communication network 24b may be coupled with PSTN 24c through a gateway. In some embodiments the gateway may be a part of IS 20 or network 24e. PSTN 24c includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 24c), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, one or more of endpoints 22, and endpoints and components of communication networks 24 may be IP telephony devices capable of participating in IM, video, and other multimedia communication sessions. IP telephony devices have the ability of encapsulating a user's voice (or other input) into IP packets so that the voice can be transmitted over a communication network. IP telephony devices may include telephones, fax machines, computers running telephony software, nodes, gateways, wired or wireless devices, hand held PDAs, or any other device capable of performing telephony functions over an IP network.

In particular embodiments, communication system 10 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

Although FIG. 1 illustrates a particular number and configuration of endpoints, IS and communication networks, communication system 10 contemplates any number or arrangement of such components for communicating media.

Figure 2:
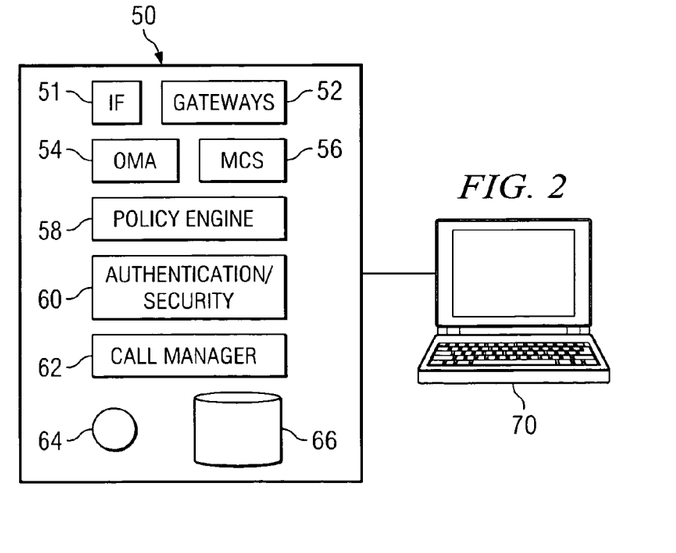
FIG. 2 illustrates an example interoperability system, in accordance with a particular embodiment.

FIG. 2 illustrates interoperability system (IS) 50, in accordance with a particular embodiment. IS 50 may be similar to and provide the same functionality as IS 20 of FIG. 1. In the illustrated embodiment, IS 50 includes interface 51, gateways 52, operations management application (OMA) 54, multipoint conference system (MCS) 56, policy engine 58, authentication and security system 60, call manager 62, processor 64 and memory module 66. IS 50 is coupled to a PC endpoint 70 that may be used to access, configure and control various functionality provided by IS 50. PC endpoint 70 may run a client application for such access, configuration and control. The client application may enable a user of endpoint 70 to receive and monitor communications from various endpoints and virtual talk groups. In particular embodiments, other types of endpoints may be utilized to access, configure and control IS 50, such as IP phones, web based thin clients, PDAs and mobile devices. IS 50 may be coupled to such endpoints (including PC endpoint 70) through one or more communication networks.

Interface 51 is used in the communication of audio, video, signaling and other data between IS 50 and other network components. For example, interface 51 may receive communications from endpoints such as endpoints of communication networks 24, endpoints 22 and endpoint 70. The communication may take place over IP networks thereby negating the need for dedicated wiring between the endpoints and the IS.

Gateways 52 may include any suitable gateways to provide network interoperability and back-end legacy application integration, such as LMR gateways, PSTN gateways and application gateways. Gateways 52 provide mapping between IP services and the interoperable networks, such as LMR network 24a of FIG. 1. In some cases gateways 52 may not be located within an IS but may be distributed throughout a communication system for enabling communications among various communication networks.

Operations management application (OMA) 54 includes functionality for configuration, management and control of IS 50, including conference and collaboration management, and may be accessed by a user via, for example, PC endpoint 70. In particular embodiments, OMA 54 may enable a user, such as dispatch personnel or administrators or a mobile user (e.g., a first responder mobile user) accessing IS 50 via a mobile endpoint, to configure, manage and participate in one or more virtual talk groups and ad hoc conferences simultaneously. In particular embodiments, OMA 54 may be accessed through a web interface, functioning for example as a soft phone for radios. A screen display may be controlled using a mouse, keypad, touch screen, voice commands or any other suitable interface. OMA 54 screen displays may include any number of functional controls to provide interoperable communications. OMA 54 may authenticate a user and obtain user configuration information upon a user accessing the OMA. OMA 54 may monitor and provide communication ability for any number of channels and modalities at one time to provide the ability for an OMA user to communicate on and control multiple virtual talk groups at once.

Multipoint conference system (MCS) 56 provides collaboration and conference services for multiple endpoints of one or more networks. For example, users of multiple endpoints (such as LMRs of different networks (e.g., networks of different agencies or groups) and different types of endpoints of different networks) may be bridged together through MCS 56 to provide virtual talk group communications. MCS 56 may include any suitable number or type of conference bridges, ports, digital signal processors or other components to facilitate communications discussed herein.

Policy engine 58 includes policies for undertaking various operations and functionality upon the occurrence of various events to provide dynamic incident management. These policies may include both pre-determined and ad hoc policies. For example, upon detecting a congestion event within a VTG a predetermined policy may be executed to assign endpoints within the congested VTG to a subgroup. The congestion event may include too many users within the VTG or too many users within the VTG trying to communicate at the same time (or within a set amount of time, for example one second). In a half-duplex system the congestion event may include multiple users simultaneously asking for floor control. In some embodiments policy engine 58 may consider a congestion event to be when, within a five minute period, IS 50 detects a certain number of instances in which less than a certain amount of time has passed between communications (e.g. 10 occurrences wherein the time between communications is less than 3 seconds), resulting in several failed attempts to gain control of the floor. Policy engine 58 may determine which particular endpoints are to be assigned to the subgroup and how the subgroup is to be configured (e.g. what channel and/or what type of communication).

Authentication and security system 60 manages access, configuration and control privileges for users of IS 50 and those participating in interoperable communications. For example, different users may have different privileges assigned for interoperable communications. Some users may only have transmit or listen privileges with respect to one or more particular talk groups, while other users may have the ability to communicate in all talk groups or setup and configure various talk groups. User privileges may change dynamically upon the occurrence of particular events and/or changes in the congestion level of respective VTGs.

Call manager 62 maintains information regarding various users, such as users of IP networks for which interoperable communications are provided by IS 50. This facilitates in the extension of PTT to IP networks and in the provision of voice and data interoperability across radio and non-radio networks. In particular embodiments, call manager 62 may maintain a listing, table, or other organization of information about users. The information may include a name or other identifier and contact information such as phone numbers and email addresses for the users. In some embodiments, the information about users is maintained within other components coupled to the call manager 62 through the network so that call manager 62 may use the network to access the information about users. In particular embodiments call manager 62 may represent any appropriate combination of hardware, software and/or encoded logic distributed throughout a communication network coupled with IS.

Processor 64 may be a microprocessor, controller, or any other suitable computing device, resource, or combination of hardware, software and/or encoded logic operable to provide, either alone or in conjunction with other IS components such as OMA 54, IS 50 functionality. Such functionality may include providing various features discussed herein to a user, such as a user of an endpoint accessing IS 50 through OMA 54. Such features may include assigning users to a VTG and/or reassigning users when the current VTG becomes overly congested, enabling the user to listen to and/or participate in communications involving endpoints and/or virtual talk groups associated with a particular event or within a particular geographic area, presenting communications of endpoints of scene-related virtual talk groups according to preconfigured or received instructions and controlling various gateways and other network components to facilitate interoperable communications among various endpoints.

Memory module 66 may be any form of volatile or non-volatile memory including, without limitation, magnetic media, optical media, random access memory (RAM), read-only memory (ROM), removable media, or any other suitable local or remote memory component. Memory module 66 may store any suitable data or information, including software and encoded logic, utilized by IS 50. In particular embodiments, memory module 66 may include data for user management, talk-group management, resource pool management, privileges, backup configuration and information and/or timestamp and activity tracking.

IS 50 may also include any number of switches, routers, firewalls, mobile access routers, access points, wireless bridges and other components in order to accommodate particular operational desires and needs.

In particular embodiments such as in the LMR network interoperability context, IS 50 may, through one or more components discussed above or through other components, encode received audio with a standard audio codec, such as G.711 or G.729. Those audio samples may be packaged in standards-based real-time transport protocol (RTP) packets suitable for transport on an IP network. At this point, the communication element may be abstracted from the distinctive characteristics of each radio system. These audio packets can be sent across the network to other radio systems either individually (unicast) or as a group (multicast). The recipient of the audio packets may be a device capable of receiving and decoding the RTP stream, such as an IP telephone or PC with appropriate software. The IP network and IP-enabled devices can be used to allow users to monitor or transmit on a particular radio channel from a desk without issuing another radio.

As indicated above, IS 50 may facilitate communication among users of endpoints of various networks through virtual channels or talk groups. For example, a channel may comprise a unidirectional or bidirectional path for transmitting and/or receiving electrical or electromagnetic signals. This may comprise, for example, a conventional radio physical RF channel. A talk group in this context may be a subgroup of users (e.g., radio users) who share a common functional responsibility and typically coordinate actions amongst themselves without radio interface with other subgroups. For example, a municipality's police department network may include various talk groups.

A virtual talk group (VTG) represents interoperability of a group of channels, for example, as an audio conference or meeting. A virtual talk group may include an associated virtual channel and an ID. Virtual channels may comprise an address, such as an IP address, associated with a virtual talk group through which users may access the virtual talk group and/or through which communications from VTG member-endpoints are bridged. Various types of virtual talk groups may be utilized in particular embodiments, such as a multicast address usable by all endpoints of the VTG, a VTG comprising multiple talk groups (e.g., multiple radio sources from different frequencies whose communications are mixed), a unicast group and a combination unicast and multicast group.

As an example, a particular virtual talk group may comprise a conference or meeting of the following: (1) a channel or other multicast path used by certain users of a police department's radio network, (2) a channel or other multicast path used by certain users of a fire department's radio network, (3) a channel or other multicast path used by certain users of a corporation's security radio network and (4) a plurality of users of IP-enabled endpoints such as IP phones, IP-enabled PDAs or PCs. An operator of IS 50 may configure the virtual talk group using any suitable interface, such as by dragging and dropping the included channels and IP endpoints into a single area representing the virtual talk group. The VTG may also be configured by IS 50 through, for example, the use of OMA 54, policy engine 58, and processor 64, according to an organization's defined polices. During the life of this VTG the communication traffic may become too high for the VTG to handle. In response IS 50 may assign some of the endpoints within the overly congested VTG to an alternate VTG.

As indicated above, IS 50 may detect congestion events within VTGs. For example, IS 50 may detect that there are too many users within a particular VTG or that there are too many communications or attempted communications within a particular VTG. In the first instance IS 50 may, for example, use OMA 54 to determine if a particular VTG has more than a predetermined number of users. If there is, IS 50 may determine that the VTG is too congested.

The determination that there are too many communications or attempted communications within a particular VTG may depend on the type or types of communication systems used by users within the VTG. As discussed above, regardless of the communication systems used by the users within a VTG, IS 50 has the capability to monitor, for example through IF 51, gateway 52, or other gateways or components of the communication system, communications transmitted within a VTG. To detect a communication within a half-duplex communication system, such as a PTT network, IS 50 may detect a request for floor control, such as a request for a 'token.' To detect a communication within a full-duplex communication system, such as a PSTN network, IS 50 may detect signal levels above a set threshold (the set threshold may be greater than the signal level for background noise).

When more than one user attempts to communicate at the same time (or within a certain amount time of each other) their communications may be said to collide. Collisions can occur between users of half-duplex and full-duplex communication systems. If IS 50 detects too many collisions within a predetermined amount of time, for example ten collisions within three minutes, IS 50, through for example policy engine 58, may assign certain users within the congested VTG to a subgroup. The determination of which users to assign to the subgroup and which users to keep within the VTG may depend on the policies of the particular IS 50 (some example policies are provided below with respect to FIG. 4).

IS 50 may also determine what communication channel and/or method the subgroup will use. IS 50 may, for example, assign the subgroup a different communication channel, such as a particular RF channel, assign the subgroup a different communication method, such as IM, or it may do both. Furthermore, like other VTGs the particular users within a subgroup may be on different channels and communicating using different communication technologies.

When IS 50 detects that a particular VTG has become too congested, policy engine 58 may determine that half (or some other predetermined percentage or number) of the users within the VTG are to be assigned to a subgroup. Furthermore, policy engine 58 may determine that the users assigned to the subgroup need to be able hear what the users in the original VTG are saying, even though they can not themselves speak with the users of the original VTG. Policy engine 58 may further determine that the users of the subgroup are at endpoints capable of communicating over IM and that the users do not need to speak with each other. Accordingly the subgroup may hear the original VTG's audible communications and will be able to communicate amongst themselves using IM. The IM communications sent by users within the subgroup may be transmitted only to members of the subgroup or they may be transmitted to members of the original VTG as well.

In other scenarios policy engine 58 may determine that it may be more advantageous to allow the users of the subgroup to be able to transmit audible messages amongst each other while still being able to hear what is being said in the original VTG. In this scenario IS 50 may assign different priority levels to the communications coming from the different VTGs. For example, within the subgroup, audible messages from users within the subgroup may be of lower priority than messages from users within the original VTG. Thus, any audible message sent from within the subgroup may be superseded by an audible message sent from within the original VTG.

It may also be that policy engine 58 determines that some of the endpoints within the original VTG should be assigned to both the original VTG and the subgroup. This may allow the endpoints assigned to both the VTG and the subgroup to work as filters or dispatchers; they can pass on key messages from the other group to their own group.

It should be noted that the assignment of half of the users from the original VTG may not affect how the remaining users of the original VTG communicate. The only change, from their perspective, is that there are now less users communicating within their VTG.

Because in some embodiments the policies that determine which users are to be assigned to a subgroup and how the users of the subgroup will communicate are predetermined there may be instances where IS 50 may make an assignment that is not proper for a particular user. To help prevent this, IS 50 may send a notice to the users that are being assigned to the subgroup before they are transferred to the subgroup. The length of time between sending the notice and making the transfer may vary depending on the situation and/or the policies of policy engine 58. Generally the length of time will be sufficiently long to provide a user with an opportunity to prepare himself and others for the assignment or to send an override command.

The override command is essentially a request not to be assigned to the subgroup. Like requests in general, it may or may not be granted. Whether an override command is granted may depend on the user sending it, the situation in which the user is involved and/or any other policies or procedures that are used by IS 50. After waiting a sufficient length of time IS 50 may transfer the user to the subgroup to which he was assigned.

MCS 56 may provide the functionality for the conference of the virtual talk group members. In particular embodiments, multiple talk groups may be patched together on a dynamic, as needed basis. In some cases a virtual talk group may not necessarily include communications through an IS but may instead include member endpoints whose communications are mapped to IP addresses at gateways (such as LMR gateways) controlled by an IS.

Any number of virtual talk groups may be configured to provide any suitable audio, data, video and control network interoperability. Virtual talk groups may be created using any suitable user/endpoint groups or channels based on location, organizational requirements, event requirements or any other suitable characteristic. An administrator or operator may configure channel details such as name, description, participants, multicast IP addresses, codec and latch options through, for example, OMA 54.

Figure 3:
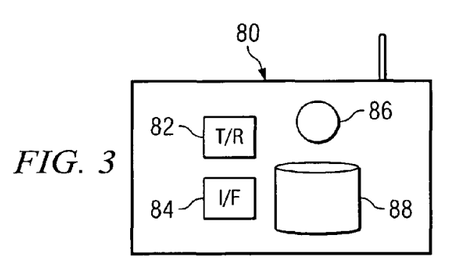
FIG. 3 illustrates an example endpoint, in accordance with a particular embodiment.

FIG. 3 illustrates an endpoint 80, which may comprise a mobile endpoint, in accordance with a particular embodiment. Endpoint 80 may be similar to, and may provide functionality similar to, other endpoints discussed herein.

In the illustrated embodiment, endpoint 80 includes a transmitter/receiver 82, a user interface 84, a processor 86 and a memory module 88. Transmitter/receiver 82 receives and transmits communications such as audio, video and other data to and from other network components and also may receive and transmit location information. User interface 84 provides a mechanism through which a user of endpoint 80 may operate the endpoint and communicate with other network devices. Interface 84 may comprise a keypad, display, touch screen, audio input or any other suitable interface. Instructions may be submitted through speech recognition, collection of keystrokes, soft key or otherwise. Such instructions may include, for example, an override command sent from endpoint 80 to prevent it from being assigned to a particular VTG.

Processor 86 may be a microprocessor, controller, or any other suitable computing device, resource, or combination of hardware, software and/or encoded logic operable to perform endpoint functionality. Processor 86, either alone or in conjunction with other endpoint components, provides endpoint functionality discussed herein. Memory module 88 may be any form of volatile or non-volatile memory including, without limitation, magnetic media, optical media, random access memory (RAM), read-only memory (ROM), removable media, or any other suitable local or remote memory component.

In particular embodiments, endpoint 80 may be used by a command officer or other user and may run a client application of IS 50. In some cases endpoint 80 may receive communications from a plurality of endpoints, and processor 86 may filter out certain communications for presentation to a user of endpoint 80 based on the location of the transmitting endpoint, the identity of the endpoint, the endpoint's response or any other criteria the command officer may choose.

Figure 4:
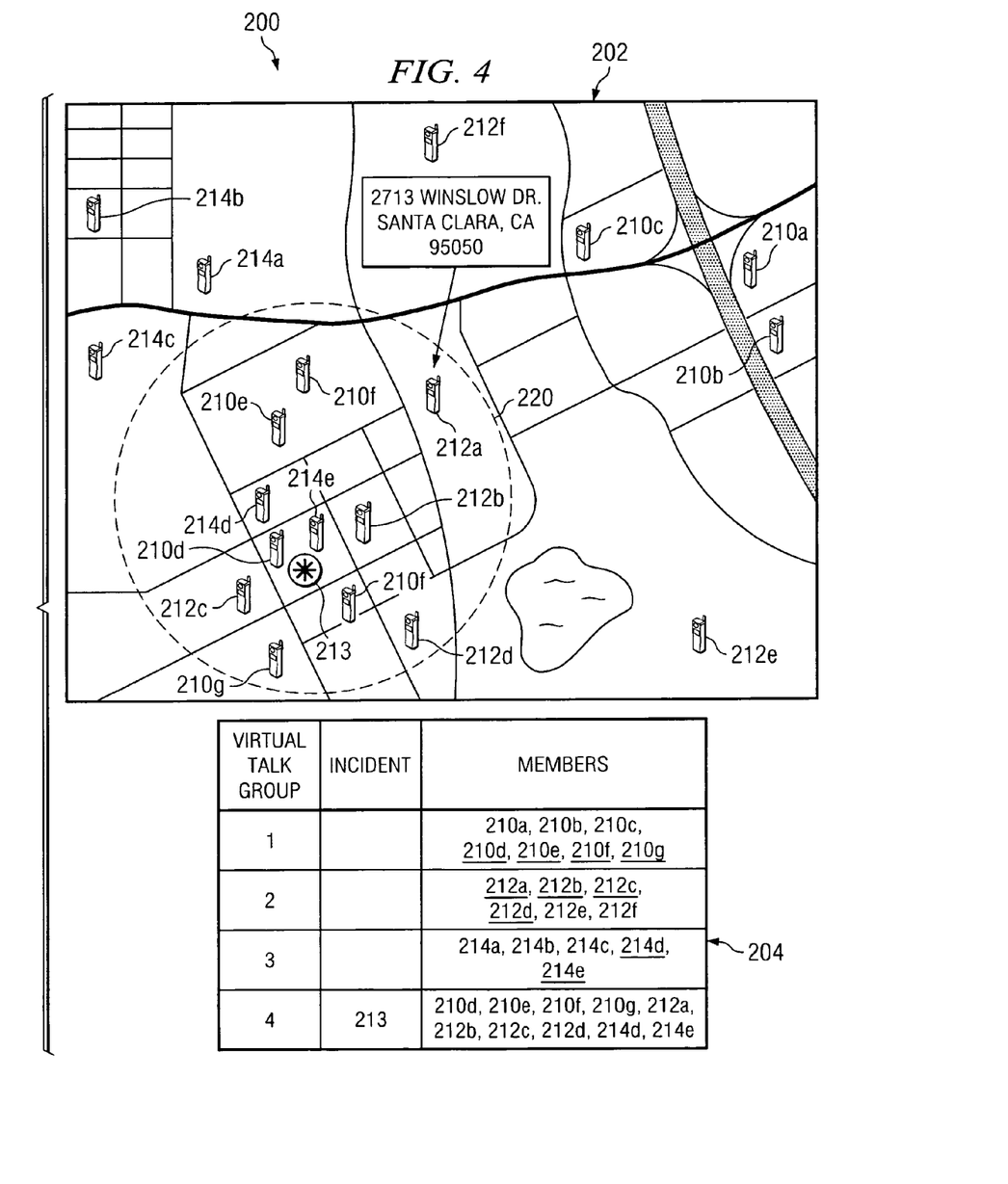
FIG. 4 illustrates an example display, in accordance with a particular embodiment.

FIG. 4 is an example display 200 of an endpoint accessing an IS through an OMA (e.g. PC endpoint 70 accessing IS 50 through OMA 54 as depicted in FIG. 2) in accordance with a particular embodiment. In the illustrated embodiment, display 200 includes location portion 202 and VTG control portion 204; however, it should be understood that displays of endpoints accessing the IS in other embodiments may include additional or different information related to functionality of the IS and communications facilitated therethrough. Furthermore, the endpoints accessing the IS may be mobile endpoints or stationary endpoints.

A user, such as a dispatcher, may use display 200 to monitor communications of various channels, talk groups, or virtual talk groups, such as various talk groups composed of land mobile radios or other endpoints. Whenever a particular endpoint 210, 212 or 214 sends a communication, such as a PTT audio message, the endpoint of display 200 may communicate the transmission to the user. The term "endpoint" and "user" are used interchangeably to refer to either the device transmitting the communication and/or to the user of the device as appropriate. As indicated above, communications transmitted from an endpoint may comprise audio, video or other data (including PTT messages, IMs, e-mails, streaming video, etc.). Display 200 indicates from which VTG and/or endpoint the communication is transmitted. The communication from the endpoint may also include location information (e.g., GPS information) identifying the location of the mobile endpoint transmitting the message.

Communications from an endpoint of a VTG, for example endpoint 212a of VTG 2, may be communicated through a base station and other components of one or more communication networks and received at an IS. The IS then communicates the message to other endpoints of the VTG if, for example, such endpoints are not a part of the same radio network or the communication has not otherwise been transmitted to other endpoints of the VTG.

As discussed above, endpoints within VTGs 1-4 may be a part of different networks, such as different radio networks of different public or private agencies or groups. For example, with respect to VTG 1, endpoints 210a-210d may be land mobile radios of law enforcement officers (LEOs) from a local municipality police network, endpoints 210e-210f may be land mobile radios of LEOs from a different municipality police network and endpoint 210g may be a cellular phone of a federal law enforcement agency network. While in this example the endpoints that comprise VTG 1 are all LOEs, it is not required that a VTG comprise endpoints of the same type; the IS allows for endpoints of different agencies to easily communicate with one another. For example, if VTG 1 also included a firefighter using a LMR, the IS may allow the firefighter to communicate with LEOs 210a-210g as though they were part of his own firefighter network. As discussed above, with respect to IS 50, the IS, through Internet Protocol, enables various endpoints of different networks to communicate in talk groups using the technology of such networks. For example, the IS may allow endpoints 210a-210d, who may be using a particular channel on their PTT radios, and endpoints 210e and 210f, who may be using a different channel on their PTT radios or different radio technology, and endpoint 210g who may be using his cell phone to communicate with one another as though they were all using similar devices on the same channel.

Figure 4A:
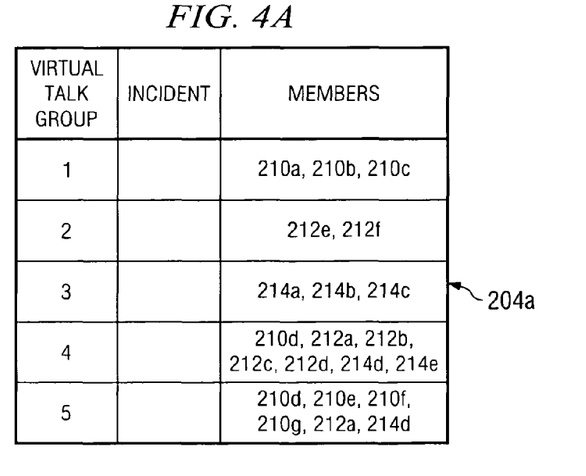
FIG. 4A illustrates an alternate virtual talk group control portion of the example display of FIG. 4, in accordance with a particular embodiment.

Display portion 200 of an endpoint may be accessed by a stationary endpoint, such as PC endpoint 70, as well as by a mobile endpoint, such as any of mobile endpoints 210, 212 and 214. Location portion 202 of display 200 may graphically present an endpoint with information such as a street map of the area of interest. VTG control portion 204 may present an endpoint with more specific information about the various endpoints displayed within location portion 202. VTG control portion 204 may, for example, display a table listing the VTGs in one column, the event to which they are responding in another column, and the endpoints within each VTG in another column. Thus display 200 provides endpoints 210, 212 and 214, who are out in the field, with useful information that can be used to quickly determine where their services may be needed and where they may expect to receive help from others. VTG control portion 204a depicted in FIG. 4A is similar to VTG control portion 204.

Display 200 will now be used in the context of a specific example crafted to aid in the explanation of the functionality of an IS, such as IS 50 depicted in FIG. 2. In the example a dispatcher is using an endpoint, such as PC endpoint 70, to access an IS, such as IS 50, to coordinate the various public safety officials assigned to him. The dispatcher may receive a 911 call from an employee of a large retail store reporting that someone has set the retail store on fire. The dispatcher, through his endpoint, is able to view display 200 and cause location portion 202 of display 200 to display a map of the area around the store. The map may be a smaller portion of a city, for example Santa Clara, Calif., and it may include the locations and names of streets, landmarks, and other topographical information. Displayed on this particular map are mobile endpoints 210a-210g, 212a-212f, and 214a-214e. In this particular example mobile endpoints 210a-210g, 212a-212f, and 214a-214e represent various public safety officials, in other scenarios the endpoints may include endpoints that are not public safety officials, such as transportation officials.

The map pulled up by the dispatcher and displayed in location portion 202 contains event marker 213 that marks the location of the burning retail store. The location marker may be set by the dispatcher or it may be set automatically, for example where the caller called from a landline telephone which can be associated with a street address.

Event marker 213 may be used to create an event area, the area may be enclosed by event border 220. The endpoints within event border 220 may be assigned to a new VTG, VTG 4, created in response to the event marked by event marker 213. Endpoints assigned to VTG 4 may or may not remain assigned to their original VTG. However, for this example, it will be assumed that endpoints within VTG 4 are no longer within their original VTGs. As in any other VTG, the endpoints within VTG 4 can listen, speak or otherwise participate in communications with the other endpoints of VTG 4. In particular embodiments, endpoints not within event border 220 may still be included in VTG 4 because, for example, the dispatcher has added the endpoint or the endpoint has chosen to join VTG 4. Conversely, in particular embodiments, endpoints within event border 220 may be excluded from VTG 4 because, for example, the endpoint sent an override command or the dispatcher has removed the endpoint from the VTG.

Here, VTG control portion 204 shows four virtual talk groups (1, 2, 3 and 4), each comprising a plurality of endpoints where the underlined endpoint represents an endpoint that has been assigned to VTG 4. More specifically: VTG 1 is depicted as including endpoints 210a-210g which, in this example, are LEOs, where LEOs 210d-210g have been assigned to VTG 4, VTG 2 is depicted as including endpoints 212a-212f which, in this example, are paramedics, where paramedics 212a-212d have been assigned to VTG 4, VTG 3 is depicted as including endpoints 214a-214e which, in this example, are firefighters, where firefighters 214d and 214e have been assigned to VTG, and VTG 4 is depicted as including LEOs 210d-210g, paramedics 212a-212d, and firefighters 214d and 214e which, in this example, are the endpoints within event border 220. These endpoints are placed in their respective VTG because each VTG has at least one endpoint that is part of a different communication network, such as a LEO from another municipality. As discussed above, particular endpoints of various networks (e.g., various public safety agency networks) may be grouped together in virtual talk groups according to any number of factors, not just what service they work for or what event border they are within.

It may be that event 213 has escalated, for example there may now be looters at the burning retail store, thus increasing the amount of communication among endpoints within VTG 4. As the communication increases the VTG may become more congested. Thus, the number of communications that may not be effectively communicated to each user of VTG 4, and the wait time required before an endpoint is able to send a communication may increase. For example, a user of a PTT endpoint may have to wait an extraordinarily long time for floor control after pressing a key to be able to talk on the VTG. To avoid this potentially costly bottleneck, some of the endpoints within VTG 4 may be automatically assigned to a subgroup and may subsequently be transferred to the subgroup, the subgroup including endpoints from VTG 4 that have been assigned to an alternate VTG to relieve the congestion in VTG 4.

There are several possible methods that can be used to determine when a particular VTG has become overly congested, as discussed above with respect to FIG. 2. Once the IS detects the congestion within a VTG the actual assignment of an endpoint to a subgroup can be based on several different factors, such as: (i) the role and/or responsibilities of the endpoint, (ii) the priority and/or rank of the endpoint, (iii) the communication patterns/history of the endpoint, (iv) interactions between particular endpoints, (v) the location of the endpoint, and (vi) an organization's predetermined operating procedures. The IS can use these factors, along with others, either individually or in combination with each other to automatically determine which endpoints may be assigned to a subgroup and how the assignment may be structured.

Utilizing the scenario begun above, the following four examples illustrate just a few of the possible ways in which these policies can be used. For these examples it will be assumed that the endpoints are numbered in order of their ranking, thus firefighter 214a is the highest ranking firefighter while 214e is the lowest.

In the first example, the IS may use the roles and responsibilities of the endpoints currently in VTG 4 in combination with the rank of these endpoints. This reassignment scheme may be useful if stopping the looters was less of a concern than extinguishing the fire and saving the victims within the burning store. Using the roles and responsibilities of the endpoints it may be determined that LEOs 210d-210g may be assigned to a subgroup because their responsibility, stopping the looters, is secondary to the responsibilities of the paramedics and firefighters. However, it may not be desirable to completely isolate LEOs 210d-210g from paramedics 212a-212d and firefighters 214d-214e. To avoid isolation the IS may further use the various endpoints' rank to assign the highest ranking firefighter 214d, paramedic 212a, and LEO 210d to both VTG 4 and the subgroup. The assignment of endpoints to the subgroup can be seen in FIG. 4A where VTG control portion 204a includes the members of VTGs 1-5 after the IS detects a congestion event and where VTG 5 comprises the endpoints assigned to the subgroup created to relieve the congestion of the original VTG 4. Thus, even though LEOs 210e-210g are not in direct contact with paramedics 212b-212d or firefighters 214c-214e because they are now in a different VTG, VTG 5, they can remain informed about what is going on and pass on their own information through the highest ranking endpoints that have been assigned to both VTG 4 and VTG 5. The highest ranking endpoints, LEO 210d, paramedic 212a and firefighter 214d, in effect, work as filters for VTGs 4 and 5. Thus, the traffic in VTG 4, for example, is reduced because only those law enforcement communications that are relevant to either firefighters or paramedics will be passed on by one of the highest ranking endpoints.

In the second example, the IS may use an organization's standard operating procedure to determine how the new VTG is created and who is assigned to it. Every organization may have its own unique standard operating procedure, thus there is a potentially limitless number of possibilities. One possible example could be that the organization has designated certain endpoints as inter-agency liaisons. This is similar to the first example in that when the communication collisions within VTG 4 exceeds the predetermined limits the IS may assign some of the endpoints within VTG 4 to a subgroup in order to reduce the amount of traffic but still allowing select endpoints to maintain communication with the rest of the endpoints. Thus it may be the organization's procedure to separate VTG 4 based on agency affiliation (one VTG for law enforcement, one VTG for firefighters and one VTG for paramedics), with the liaisons being able to communicate with all the new VTGs. For example, firefighter 214e may be the fire department's inter-agency liaison, LEO 210f may be the police department's inter-agency liaison, and paramedic 212b may be the paramedic's inter-agency liaison. Thus, after detecting the congestion and forming the subgroup, if firefighter 214d sends a communication saying that he located a burn victim while putting out the fire not only will firefighter 214e here the communication but so will LEO 210f and paramedic 212b. It should be noted that the firefighter, paramedic, and law enforcement subgroups are comprised of endpoints that were originally part of VTG 4, and the fact that they are divided based on agency affiliation (like VTGs 1-3) does not mean that all endpoints of that agency are included within these new VTGs. For example, the firefighter subgroup includes only firefighters 214d-214e, not all firefighters 214a-214e, as in VTG 3.

In the third example the IS can use the location of particular endpoints as well as the communication history in determining how to set up a new VTG. This may be useful if, for example, some of the endpoints of VTG 4 are within the burning store and constantly communicating with each other trying to coordinate their efforts to resolve their current crisis. For example, if firefighter 214d has found someone trapped in an area not easily accessible firefighter 214d may need to provide firefighter 214e with information on where to spray water, and paramedics 212a and 212b with information on how to reach the trapped person. In some embodiments the IS maintains a communication log that stores information concerning who was talking at any given time. This information may be used to determine who is talking to whom and it may be combined with location information to help determine who should be assigned to a new VTG. Thus, firefighters 214d and 214e and paramedics 212a and 212b can talk within their new VTG without interruptions from other endpoints talking over VTG 4.

The communication history may also be used to determine whether adding several endpoints to an existing VTG will cause a congestion event. For example, assume that a dispatcher wants to add the endpoints of an emergency response VTG, comprising several endpoints, to VTG 4. The IS may look at the communication history of VTG 4 and determine, for example, that within the last five minutes there were eight instances in which the IS almost created a subgroup from VTG 4. The IS may also look at the communication history of the emergency response VTG and determine, for example, that whenever the emergency response VTG first joins a VTG they send a large number of communications (perhaps to asses the situation and take control) to the surrounding endpoints. Similarly, the IS may determine, for example, that whenever the emergency response VTG first comes onto a scene, endpoint 212a of VTG 4 sends and receives a large number of communications to and from the endpoints of the emergency response VTG. Based on any of these determinations (or any other determination the IS may make based on the communication history of a VTG or an endpoint) the IS may provide the dispatcher with a warning that adding the emergency response VTG to VTG 4 may cause a congestion event.

In the fourth example the IS may use the interactions between the highest ranking endpoints from each agency to determine who is in charge. This may be useful in the situation where, for example, firefighter 214d is directing everyone and wants to be sure that he receives all the reported information in a timely manner. the IS may then divide VTG 4 into three separate VTGs representing the three agencies with firefighter 214d being assigned to all three new VTGs. Thus firefighter 214d can continue to direct all the various public safety personnel based on information obtained from the different agencies, while greatly reducing the risk of potentially important information being received too late. For example, where, because of congestion within a VTG, a particular endpoint is not able to quickly gain control of the floor the endpoint may not be able to pass on his information or send out his request in a timely manner.

In these four examples the assignment of endpoints to new VTGs may include placing the newly assigned endpoints on a different radio frequency/channel or keeping them on the same radio frequency/channel but altering their capabilities. This can be seen by further exploration of the first example described above and depicted in FIG. 4A, where LEOs 210d-210g of VTG 4 were assigned to a new subgroup, VTG 5, while LEO 210d, paramedic 212a, and firefighter 214d were assigned to both the new subgroup and the original VTG.

Assume that prior to detecting the congestion event the endpoints using a particular channel to send and receive communications within VTG 4 (FIG. 4) used channel 1. When the IS creates the subgroup, VTG 5, it assigns a different channel, such as channel 2, that is not used by any other communication networks or VTGs. However, not all endpoints assigned to VTG 5 will be on channel 2, nor will all the remaining endpoints within VTG 4 (FIG. 4A) remain on channel 1. Rather, the highest ranking endpoints that have been assigned to multiple VTGs may use their own channel. Accordingly, LEO 210*d* may be assigned a different channel, such as channel 3, that is not used by any other communication networks or VTGs and similarly paramedic 212*a* and firefighter 214*d* may be assigned to channel 4. This allows LEO 210*d*, paramedic 212*a* and firefighter 214*d* to be able to hear what is going on within both VTGs 4 (FIG. 4A) and 5 but only speak with endpoints within their respective VTG (LEO 212*d* with VTG 5, and paramedic 212*a* and firefighter 214*d* with VTG 4).

The transmission and reception of communications from LEO 210*d* with VTGs as depicted in FIG. 4A will be examined in more detail. LEO 210*d* needs to be able to listen to VTG 4 and VTG 5, and VTG 4 and VTG 5 use different channels—channel 1 and channel 2, respectively. Thus, LEO 210*d* can not listen to both VTGs from channel 1 or 2 alone. Furthermore, if for example, the IS facilitated the retransmission of communications of channel 1 to LEO 210*d* via channel 2, then all of VTG 5 would hear VTG 4. Therefore, LEO 210*d* is assigned to channel 3, through which communications of channel 1 and channel 2 (as well as any other communications sent within VTGs 4 and 5 respectively) are communicated. Furthermore, when LEO 210*d* transmits his communication over channel 3 the IS may facilitate the rebroadcasting of the communication over channel 2 so that the endpoints within VTG 5 can hear and/or over channel 1 so that the endpoints within VTG 4 can hear.

Endpoints in the four examples above may also be assigned to an alternate communication method, such as IM. The endpoints within the subgroup may communicate with each other using IM messages. The IS may facilitate the transmission of IM messages among all the endpoints within the subgroup. In particular scenarios the IS may also transmit the IM messages of the subgroup to the original VTG. Furthermore, in some embodiments or scenarios the endpoints within the subgroup may still be able to hear the oral communications of endpoints within the original VTG. In this situation the IS may facilitate rebroadcasting the communications of users within the original VTG to the users in the subgroup, but it would not facilitate the rebroadcasting of the oral communications of the users in the subgroup. Thus reducing the amount of oral communication within the VTG by the amount of IM communication now transmitted within the subgroup but still allowing the subgroup to hear what is going on while The scenario and four examples from above are merely illustrative of some of the features of the present invention. The description above, as applied to VTGs 4 and 5, may equally be applied to any other VTG, such as VTGs 1-3. For example, at around the time of a shift change, paramedics 212*a*-212*f* of VTG 2 may comprise paramedics from two different shifts. The communication volume between the two shifts of paramedics may trigger a congestion event. Thus, the IS may assign the new shift of paramedics to an alternate VTG and the shift leaders for both shifts to both VTG 2 and the alternate VTG so that the shift leaders can coordinate the shift change.

It will be recognized by those of ordinary skill in the art that endpoints and interoperability systems disclosed herein are merely example configurations in accordance with particular embodiments. These systems may include any number of interfaces, processors, memory modules, or other components to accomplish the functionality and features described herein. In addition, these components and other desired components for performing the above described functionality may be centrally located (local) with respect to one another, or distributed throughout communication systems and networks. In addition, one or more components of these systems and devices may work together in performing various functionality described herein.

Figure 5:
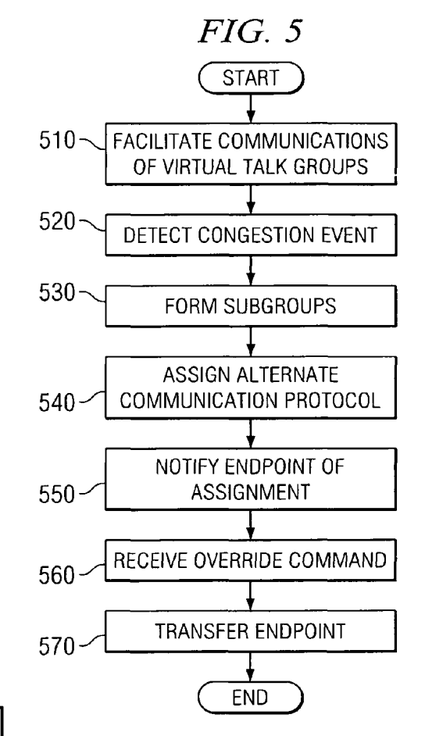
FIG. 5 illustrates a method for providing interoperable communications with congestion management, in accordance with a particular embodiment.

FIG. 5 illustrates a method for providing interoperable communications with congestion management, in accordance with a particular embodiment. The method begins at step 510 where the system facilitates the communications of virtual talk groups. The virtual talk groups may each comprise a plurality of endpoints of different communication networks. It should be understood that for purposes of the descriptions and claims herein, whenever a VTG is described as comprising a plurality of endpoints of different communication networks, in addition to including at least some endpoints of different communication networks, the VTG may also include some endpoints of the same communication network. For example, the VTG may include a plurality of endpoints of the same police department network in addition to one or more endpoints of other communication networks, such as other police or fire department or private company networks. Moreover, in some cases, endpoints of different communication networks may include endpoints that are communicating on different channels or frequencies. The different communication networks may comprise networks of different technologies, such as IP, cellular, PSTN, LMR, CDMA, GSM, TDMA, GPRS and satellite. In particular embodiments, at least some of the endpoints of the virtual talk groups may communicate through PTT technology. In addition, some of the endpoints may comprise IP endpoints. Moreover, the different communication networks may comprise networks of various safety and security agencies, whether public or private as well as networks of public and private groups, companies or organizations. The communications may be received at an interoperability system and/or at a client application of an interoperability system.

The virtual talk groups may include communications (from the various endpoints) that are facilitated, for example, by an IS by mapping the communications to a multicast IP address or by bridging the communications at a multipoint conference system of the IS.

The user may be receiving communication from endpoints of the monitored plurality of virtual talk groups, for example, through a PC, IP phone or other endpoint running a client application that accesses an IS. The communication may be audio, video, text or any other relevant media.

The communications may be received at a user's mobile endpoint. In some cases an IS may facilitate the transmittal of the communications to the endpoint, such as by controlling LMR gateways or other components, by mapping communications to a multicast IP address, by bridging communications into a mixed stream or by other methods. In some cases the communications may be received from endpoints of different virtual talk groups. The communications may be received via multicast streams or nailed dialed connections, such as those using SIP protocol. In particular embodiments, at least some of the transmitting endpoints may communicate through PTT technology. In addition, some of the endpoints may comprise IP endpoints.

At step 520 the system detects that a congestion event has occurred. This may occur, for example, when there are more users trying to communicate within the same VTG than is feasible. There are several different ways for detecting a congestion event depending on the type of technology that is used in transmitting the communications. For example, in a half-duplex system, in order to transmit a communication over a particular channel, the endpoint must have the 'token' to control the floor for that channel. The system can then use a request for the 'token' as an indication of an endpoint wanting to transmit a communication. As long as one endpoint has the 'token' no other endpoint can transmit communications on the channel. If the system detects too many requests for the 'token' within too short of a period of time the system may determine that there is too much communication on the channel for the VTG, and thus trigger a congestion event. The system may track the overall number of requests for the 'token,' the number of requests that are received simultaneously (or within some other relevant time period), or both numbers to determine if a congestion event has been triggered.

In a full-duplex system the endpoints do not need a 'token' to transmit a communication because any endpoint can send a communication at any time. One way to track the level of congestion in this type of communication system or in VTGs that include full duplex endpoints is to track the signal level of the various endpoints within the VTG. When an endpoint within a full-duplex VTG transmits a communication the level of the signal increases. The signal increases because the endpoint is transmitting more than just background noise. Thus, to ascertain when a user is transmitting a communication the system can detect when a signal's level is above a predetermine threshold level, this is known as Voice Activity Detection (VAD) (usually the threshold level will be set above the level of background noise). If the system detects too many signals above the predetermined threshold within too short of a period of time the system may determine that there is too much communication within the VTG and may thus trigger a congestion event. The system may track the overall number of signals above the predetermined threshold, the number of signals above the predetermined threshold that are received simultaneously (or within some other relevant time period), or both numbers to determine if a congestion event has been triggered.

Furthermore, in a VTG that uses both full-duplex and half-duplex communication systems the IS may track both signals above a predetermined threshold as well as token requests to determine if the VTG is congested.

Essentially, the detection of a congestion event indicates that there are too many endpoints within the current VTG or that there are too many communications being attempted in the VTG. To ensure successful transmission of communications within a congested VTG the IS, at step 530, assigns endpoints within a VTG that has become congested to an alternate VTG or subgroup. How subgroups are formed may depend on one or more factors from a wide variety of factors, many of which are similar to the types of criteria that an organization may use in originally forming the VTG. These factors may be included within a policy engine, such as policy engine 58 of FIG. 2. Some of the possible factors for forming subgroups are the proximity of an endpoint to a particular event, the rank of the endpoint, the role or responsibilities (e.g. put out the fire) of the endpoint or the interaction of the endpoint with other endpoints.

After deciding which endpoints are to be part of which subgroup the system assigns a communication protocol to the endpoints at step 540. Depending on how the system formed the subgroups at step 530, the assignment of an alternate communication protocol at step 540 could involve a change in the communication channel or the method of communication (e.g. IM vs. talk). There are many different possible ways that the system can assign communication protocols, just some of the possibilities include: (1) assigning the subgroup to a different communication method (e.g. IM), (2) keeping the subgroup on the same communication channel but lowering or raising the communication priority of the subgroup, (3) assigning the subgroup to a different communication channel, or (4) assigning the subgroup to a different communication channel but allowing at least one endpoint from the subgroup and one endpoint from original VTG to be able to send and/or receive communications from both the VTG and the subgroup.

In particular embodiments the system may, at step 550, notify the endpoints that are being assigned to the alternate communication protocol so that the endpoints are able to make any necessary preparations prior to being transferred to the new communication protocol. For example, if an endpoint is being assigned to only transmit IM communications then the user of the endpoint may position the endpoint so that he has easy access to a keyboard to type his IM messages.

The notice sent at step 550 also may prompt the endpoint with an option to send an override command that the system may receive at step 560. The override command may prevent the endpoint from being transferred to the alternate communication protocol at step 570. There are many instances in which an endpoint may need to override an assignment to an alternate communication protocol. For example, if the endpoint was assigned to a particular subgroup based on his role, the endpoint may, despite his role, need to remain in communication with the original VTG (e.g. a paramedic responding to a fire may be assigned to a subgroup, but the paramedic may need to be able to talk with the firefighters because he is currently in the burning building) and thus may override his assignment to the alternate communication protocol.

After notifying the endpoints of the assignment at step 550, the system waits an amount of time sufficient enough to provide the endpoints that are to be assigned with an opportunity to make any necessary preparations for the assignment, for example notifying the other endpoints that he will be transferred to a subgroup. After such time the endpoints are transferred at step 570 to their respective communication protocol. Once transferred the endpoints within the subgroup will be bale to communicate within their new VTG according to communication protocol associated with the new VTG.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10 and illustrated endpoints and interoperability systems, these elements may be combined, rearranged or positioned in order to accommodate particular routing architectures or needs. In addition, any of these elements may be provided as separate external components to communication system 10 and illustrated endpoints and interoperability systems, or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for interoperable communications with congestion management, comprising:
   facilitating communications of a plurality of virtual talk groups, each virtual talk group comprising a plurality of endpoints of different communication networks communicating using a respective communication channel;
   detecting, for a first virtual talk group of the plurality of virtual talk groups, a congestion event;
   in response to detecting the congestion event, forming from the first virtual talk group one or more subgroups, each subgroup comprising at least two endpoints from the first virtual talk group;
   assigning to each subgroup a respective alternate communication protocol comprising a communication path or method of communication for use by the plurality of endpoints of the subgroup;
   wherein the endpoints remaining in the first virtual talk group are able to continue to communicate with each other after formation of the one or more subgroups; and
   wherein the endpoints in each subgroup are able to communicate with the other endpoints in the subgroup using the alternate communication protocol.

2. The method of claim 1, further comprising transferring each endpoint of each subgroup to the respective alternate communication protocol of the subgroup.

3. The method of claim 1, wherein detecting a congestion event comprises detecting a first number of collisions within a first amount of time, a collision comprising the receipt of two or more requests for access to the respective communication channel within a second amount of time.

4. The method of claim 1, wherein detecting a congestion event comprises detecting a second number of collisions within a third amount of time, a collision comprising the receipt of two or more requests for access to the respective communication channel approximately simultaneously.

5. The method of claim 1, wherein detecting a congestion event comprises detecting voice activity from a third number of endpoints within a fourth amount of time.

6. The method of claim 1, wherein assigning to each subgroup an alternate communication protocol comprises assigning at least one of the subgroups to an instant messaging (IM) communication protocol.

7. The method of claim 1, wherein assigning to each subgroup an alternate communication protocol comprises assigning at least one of the subgroups to an alternate communication channel.

8. The method of claim 1, wherein forming from the first virtual talk group one or more subgroups comprises forming the one or more subgroups based on a predetermined policy.

9. The method of claim 8, wherein forming the one or more subgroups based on a predetermined policy comprises forming the one or more subgroups based on a priority of users of the plurality of endpoints of the first virtual talk group.

10. The method of claim 1, wherein forming from the first virtual talk group one or more subgroups comprises forming the one or more subgroups based on interactions of one or more of the endpoints of the first virtual talk group.

11. The method of claim 1, further comprising notifying each endpoint of each subgroup that the endpoint will be assigned to the respective alternate communication protocol of the subgroup.

12. The method of claim 11, further comprising receiving from a first endpoint of a subgroup of the one or more subgroups an override command in response to the notification that the endpoint will be assigned to an alternate communication protocol of the subgroup, the override command preventing the first endpoint from being assigned to the alternate communication protocol of the subgroup.

13. The method of claim 1, wherein the subgroups comprise at least two subgroups comprising a common endpoint.

14. A system for providing interoperable communications with congestion management, comprising:
   an interface operable to facilitate communications of a plurality of virtual talk groups, each virtual talk group comprising a plurality of endpoints of different communication networks communicating using a respective communication channel; and
   a processor coupled to the interface and operable to:
      detect, for a first virtual talk group of the plurality of virtual talk groups, a congestion event;
      in response to detecting the congestion event, form from the first virtual talk group one or more subgroups, each subgroup comprising at least two endpoints from the first virtual talk group; and
      assign to each subgroup a respective alternate communication protocol comprising a communication path or method of communication for use by the plurality of endpoints of the subgroup;
   wherein the endpoints remaining in the first virtual talk group are able to continue to communicate with each other after formation of the one or more subgroups; and
   wherein the endpoints in each subgroup are able to communicate with the other endpoints in the subgroup using the alternate communication protocol.

15. The system of claim 14, wherein the processor is further operable to transfer each endpoint of each subgroup to the respective alternate communication protocol of the subgroup.

16. The system of claim 14, wherein the processor operable to detect a congestion event comprises a processor operable to detect a first number of collisions within a first amount of time, a collision comprising the receipt of two or more requests for access to the respective communication channel within a second amount of time.

17. The system of claim 14, wherein the processor operable to detect a congestion event comprises a processor operable to detect a second number of collisions within a third amount of time, a collision comprising the receipt of two or more requests for access to the respective communication channel approximately simultaneously.

18. The system of claim 14, wherein the processor operable to detect a congestion event comprises a processor operable to detect voice activity from a third number of endpoints within a fourth amount of time.

19. The system of claim 14, wherein the processor operable to assign to each subgroup an alternate communication protocol comprises a processor operable to assign at least one of the subgroups to an instant messaging (IM) communication protocol.

20. The system of claim 14, wherein the processor operable to assign to each subgroup an alternate communication protocol comprises a processor operable to assign at least one of the subgroups to an alternate communication channel.

21. The system of claim 14, wherein the processor operable to form from the first virtual talk group one or more subgroups comprises a processor operable to form the one or more subgroups based on a predetermined policy.

22. The system of claim 21, wherein the processor operable to form the one or more subgroups based on a predetermined policy comprises a processor operable to form the one or more subgroups based on a priority of users of the plurality of endpoints of the first virtual talk group.

23. The system of claim 14, wherein the processor operable to form from the first virtual talk group one or more subgroups comprises a processor operable to form the one or more subgroups based on interactions of one or more of the endpoints of the first virtual talk group.

24. The system of claim 14, wherein the processor is further operable to notify each endpoint of each subgroup that the endpoint will be assigned to the respective alternate communication protocol of the subgroup.

25. The system of claim 24, wherein the processor is further operable to receive from a first endpoint of a subgroup of the one or more subgroups an override command in response to the notification that the endpoint will be assigned to an alternate communication protocol of the subgroup, the override command preventing the first endpoint from being assigned to the alternate communication protocol of the subgroup.

26. The system of claim 14, wherein the subgroups comprise at least two subgroups comprising a common endpoint.

27. Logic embodied in a non-transitory computer readable medium, the computer readable medium comprising code operable to:
facilitate communications of a plurality of virtual talk groups, each virtual talk group comprising a plurality of endpoints of different communication networks communicating using a respective communication channel;
detect, for a first virtual talk group of the plurality of virtual talk groups, a congestion event;
in response to detecting the congestion event, form from the first virtual talk group one or more subgroups, each subgroup comprising at least two endpoints from the first virtual talk group;
assign to each subgroup a respective alternate communication protocol comprising a communication path or method of communication for use by the plurality of endpoints of the subgroup;
wherein the endpoints remaining in the first virtual talk group are able to continue to communicate with each other after formation of the one or more subgroups; and
wherein the endpoints in each subgroup are able to communicate with the other endpoints in the subgroup using the alternate communication protocol.

28. The medium of claim 27, wherein the code is further operable to transfer each endpoint of each subgroup to the respective alternate communication protocol of the subgroup.

29. The medium of claim 27, wherein the code operable to detect a congestion event comprises code operable to detect a first number of collisions within a first amount of time, a collision comprising the receipt of two or more requests for access to the respective communication channel within a second amount of time.

30. The medium of claim 27, wherein the code operable to detect a congestion event comprises code operable to detect a second number of collisions within a third amount of time, a collision comprising the receipt of two or more requests for access to the respective communication channel approximately simultaneously.

31. The medium of claim 27, wherein the code operable to detect a congestion event comprises code operable to detect voice activity from a third number of endpoints within a fourth amount of time.

32. The medium of claim 27, wherein the code operable to assign to each subgroup an alternate communication protocol comprises code operable to assign at least one of the subgroups to an instant messaging (IM) communication protocol.

33. The medium of claim 27, wherein the code operable to assign to each subgroup an alternate communication protocol comprises code operable to assign at least one of the subgroups to an alternate communication channel.

34. The medium of claim 27, wherein the code operable to form from the first virtual talk group one or more subgroups comprises code operable to form the one or more subgroups based on a predetermined policy.

35. The medium of claim 34, wherein the code operable to form the one or more subgroups based on a predetermined policy comprises code operable to form the one or more subgroups based on a priority of users of the plurality of endpoints of the first virtual talk group.

36. The medium of claim 27, wherein the code operable to form from the first virtual talk group one or more subgroups comprises code operable to form the one or more subgroups based on interactions of one or more of the endpoints of the first virtual talk group.

37. The medium of claim 27, wherein the code is further operable to notify each endpoint of each subgroup that the endpoint will be assigned to the respective alternate communication protocol of the subgroup.

38. The medium of claim 37, wherein the code is further operable to receive from a first endpoint of a subgroup of the one or more subgroups an override command in response to the notification that the endpoint will be assigned to an alternate communication protocol of the subgroup, the override command preventing the first endpoint from being assigned to the alternate communication protocol of the subgroup.

39. The medium of claim 27, wherein the subgroups comprise at least two subgroups comprising a common endpoint.

40. A system for providing interoperable communications with congestion management, comprising:
means for facilitating communications of a plurality of virtual talk groups, each virtual talk group comprising a plurality of endpoints of different communication networks communicating using a respective communication channel;
means for detecting, for a first virtual talk group of the plurality of virtual talk groups, a congestion event;
in response to detecting the congestion event, means for forming from the first virtual talk group one or more subgroups, each subgroup comprising at least two endpoints from the first virtual talk group;
means for assigning to each subgroup a respective alternate communication protocol comprising a communication path or method of communication for use by the plurality of endpoints of the subgroup;
wherein the endpoints remaining in the first virtual talk group are able to continue to communicate with each other after formation of the one or more subgroups; and
wherein the endpoints in each subgroup are able to communicate with the other endpoints in the subgroup using the alternate communication protocol.

41. The method of claim 1, wherein the endpoints in each subgroup are unable to communicate with the endpoints remaining in the first virtual talk group.

* * * * *